(12) United States Patent
Ditzler

(10) Patent No.: US 6,902,342 B1
(45) Date of Patent: Jun. 7, 2005

(54) SHORT TELESCOPING TURNBUCKLE

(75) Inventor: Steven Jay Ditzler, Bellevue, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/847,830

(22) Filed: May 18, 2004

(51) Int. Cl.[7] ............................................. F16D 1/12
(52) U.S. Cl. ........................................ 403/78; 403/79
(58) Field of Search ........................... 403/43–45, 362, 403/22, 78, 79, 164, 165

(56) References Cited

U.S. PATENT DOCUMENTS

| | | | |
|---|---|---|---|
| 925,448 A | * | 6/1909 | Boyden ..................... 403/44 X |
| 4,061,298 A | | 12/1977 | Kober |
| 4,198,174 A | * | 4/1980 | Borowiec et al. ............. 403/44 |
| 5,702,196 A | | 12/1997 | Petercsak |
| 5,906,450 A | | 5/1999 | Ng |
| 6,357,953 B1 | | 3/2002 | Ballantyne |
| 6,520,709 B1 | * | 2/2003 | Mosing et al. .............. 403/305 |

* cited by examiner

Primary Examiner—John R. Cottingham

(57) ABSTRACT

A short and simple telescoping turnbuckle is formed by threadedly engaging three parts including a first end, a second end and a length adjuster. The first end includes a connection portion such as a hook or a ring and a threaded shaft. The second end includes a connection portion and a internally threaded tubular potion. The length adjuster includes a cylinder having internal threads to engage the shaft of the first end and external threads to engage the tubular portion of the second end. The length of the telescoping turnbuckle may be altered by rotating the length adjuster about the rotational axis of the turnbuckle.

12 Claims, 5 Drawing Sheets

SHORT TELESCOPING TURNBUCKLE

FIELD OF THE INVENTION

The invention relates generally to adjustable link mechanisms and specifically relates to short turnbuckles for use in applications where space is limited.

BACKGROUND OF THE INVENTION

Turnbuckles are widely used in the construction industry as well as other industries to provide tight and adjustable line and cable connections. Turnbuckles are also used to adjust mechanical linkages having connecting ends that are rotationally constrained, i.e., connecting ends that cannot rotate relative to one another. Space as well as overall turnbuckle complexity are, at times, serious considerations when solving problems requiring turnbuckles that are, inter alia, short, simple and strong.

SUMMARY OF THE INVENTION

As stated above, turnbuckles are widely used in many industries to provide for adjustable connections and, generally, to make those connections tight over varying distances. These turnbuckles tend to be either long or complex. Unnecessary length tends to take up valuable space in some applications while unnecessary complexity tends to increase the costs and lower reliability and strength in other applications.

Described herein is a short and simple turnbuckle that can telescope to a relatively great length. The turnbuckle includes essentially three parts: (1) a first end including a ring shaped portion and a threaded shaft portion; (2) a length adjuster which is, essentially, a cylinder which is threaded on its internal and external diameter; and (3) a second end including a ring shaped portion and a tubular portion which is threaded on its internal diameter. The turnbuckle is formed by threadedly engaging the threaded shaft of the first the internal diameter of the length adjuster and threadedly engaging the external diameter of the length adjuster with the internal diameter of the tubular portion of the second end. The threaded shaft portion, the cylinder and the tubular portion rotate about a common rotational axis. The length of the turnbuckle may be altered by rotationally immobilizing the first end and the second end and turning the length adjuster about the rotational axis. The shortest length for the invention is obtained when all threads are completely engaged, i.e., when the externally threaded shaft portion of the first end and the external thread of the length adjuster are as far inside the tubular potion of the second end as the threads of each part will allow.

BRIEF DESCRIPTION OF THE DRAWINGS

Embodiments of the invention will be described in detail, with references to the following figures, wherein.

DESCRIPTION OF THE ILLUSTRATED EMBODIMENTS

Figure 1:
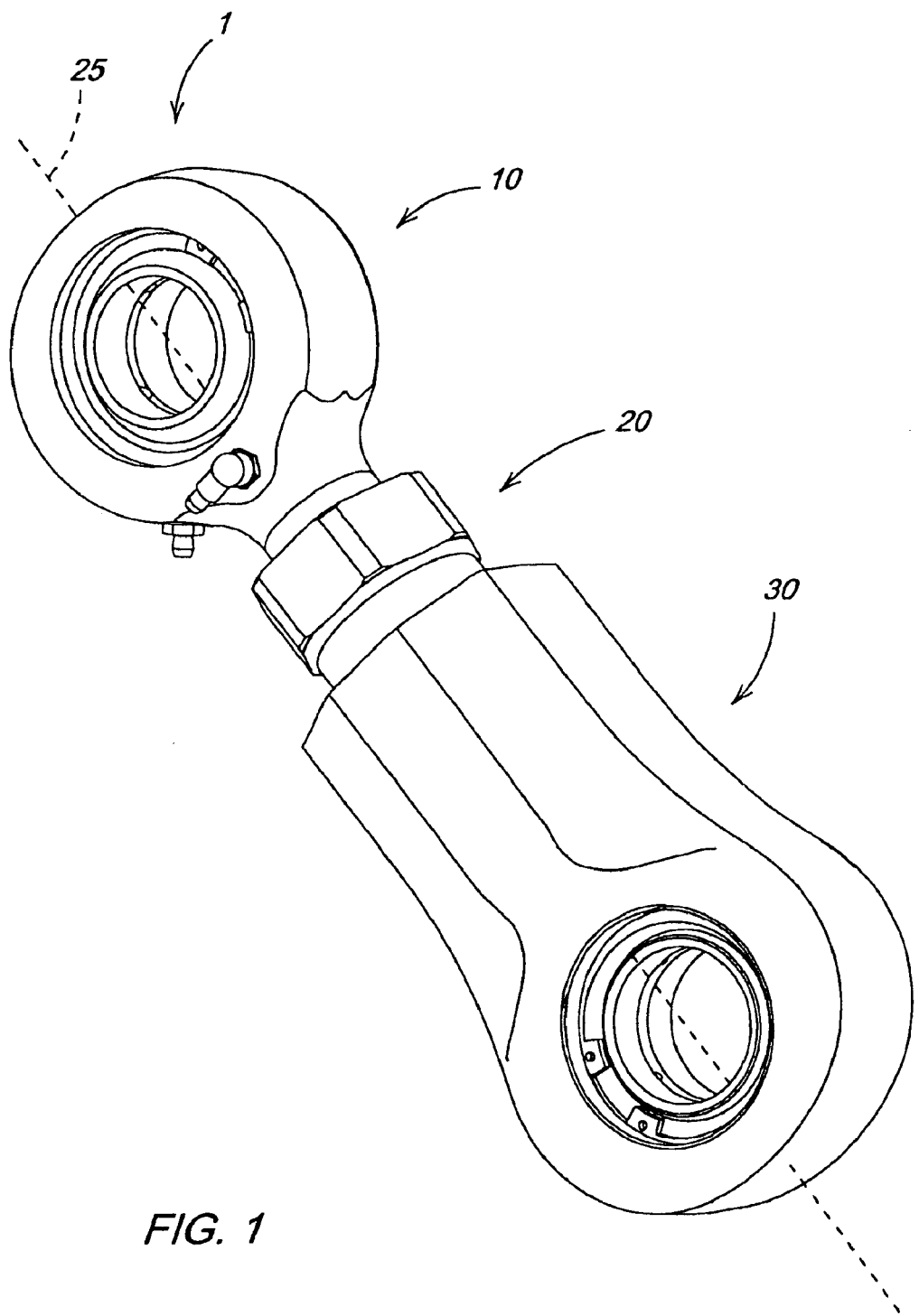
FIG. 1 is an oblique view of an exemplary embodiment of the invention.
Figure 2:
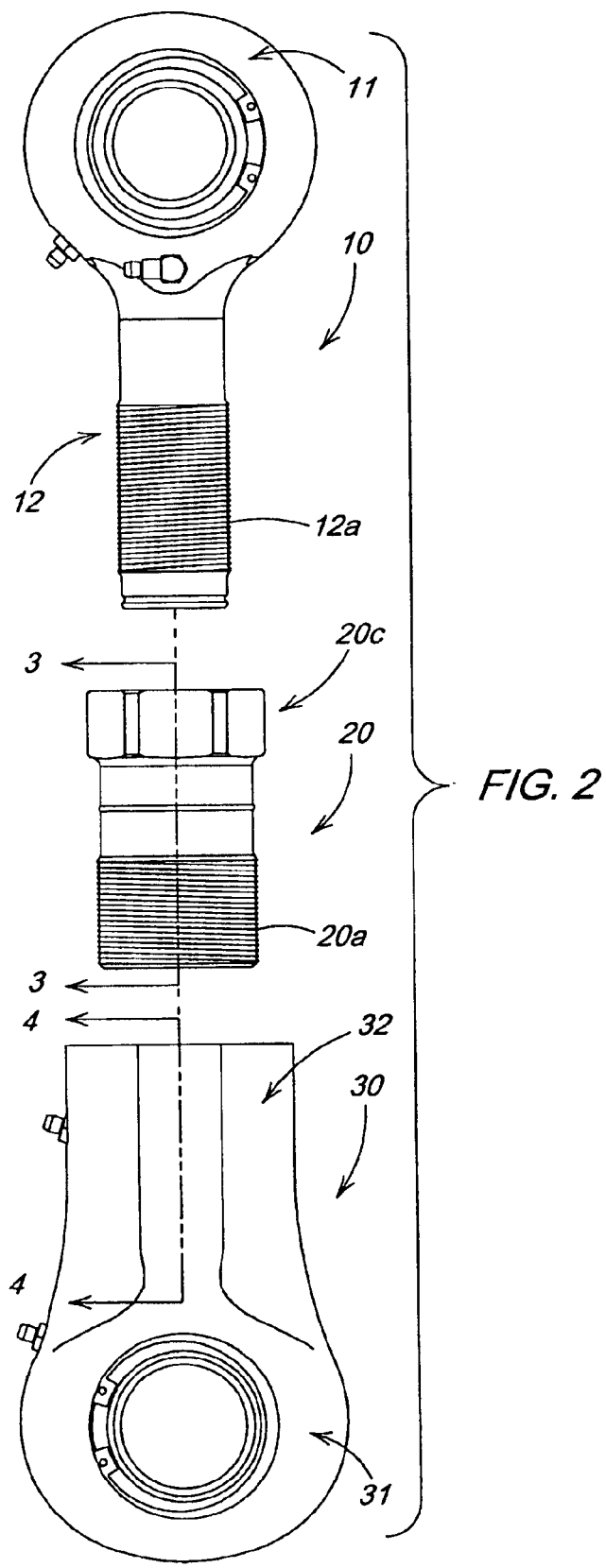
FIG. 2 is an exploded view of the turnbuckle illustrated in FIG. 1.
Figure 3:
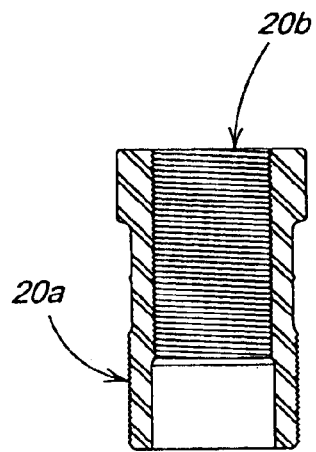
FIG. 3 is a sectional view of the length adjuster illustrated in FIG. 2.
Figure 4:
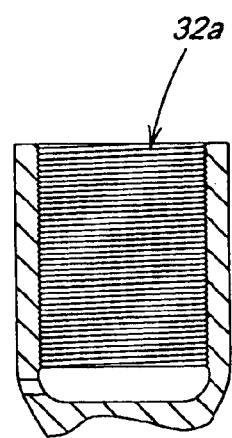
FIG. 4 is a sectional view of the second end illustrated in FIG. 2.

FIG. 1 is an oblique view of a first exemplary embodiment of the turnbuckle 1 of the invention. The turnbuckle 1 includes a first end 10, a length adjuster 20 and a second end 30. As illustrated in FIG. 1 and FIG. 2, the first end 10 includes a ring shaped portion 11 and a shaft portion 12 with a first external thread 12a having a first direction. As shown in FIG. 2 and FIG. 3, the length adjuster 20 is a cylinder having a second external thread 20a, a first internal thread 20b, and a hexagonal portion 20c. As shown in FIG. 2 and FIG. 4, the second end 30 includes a ring shaped portion 31 and a tubular portion 32. As illustrated in FIG. 2, the ring shaped portion and the tubular portion 32 are integrated, i.e. one piece. The tubular portion 32 includes a second internal thread 32a. The turnbuckle 1 as well as a rotational axis 25 of the turnbuckle 1 of FIG. 1 is formed by threadedly engaging the threaded shaft portion 12 with the first internal thread 20b to form a first threaded engagement and threadedly engaging the second external thread 20a with the second internal thread 32a to form a second threaded engagement.

The first and second external threads 12a and 20a as well as the first and second internal threads 20b and 32b are oriented in opposite directions. In other words, engagement 1 lengthens and shortens the turnbuckle 1 with rotations about the rotational axis 25 of the turnbuckle 1 that are opposite in direction to rotations for engagement 2 to accomplish the same functions. Under such conditions, the turnbuckle 1 may be lengthened or shortened by rotating the length adjuster 20 about the rotational axis 25 through a greater angle in one direction than each of the first end 10 and the second end 30 in the one direction. Thus, the turnbuckle 1 may be lengthened or shortened by rotationally constraining the first and second ends 10 and 30 and rotating the length adjuster 20 about the rotational axis 25.

Figure 5:
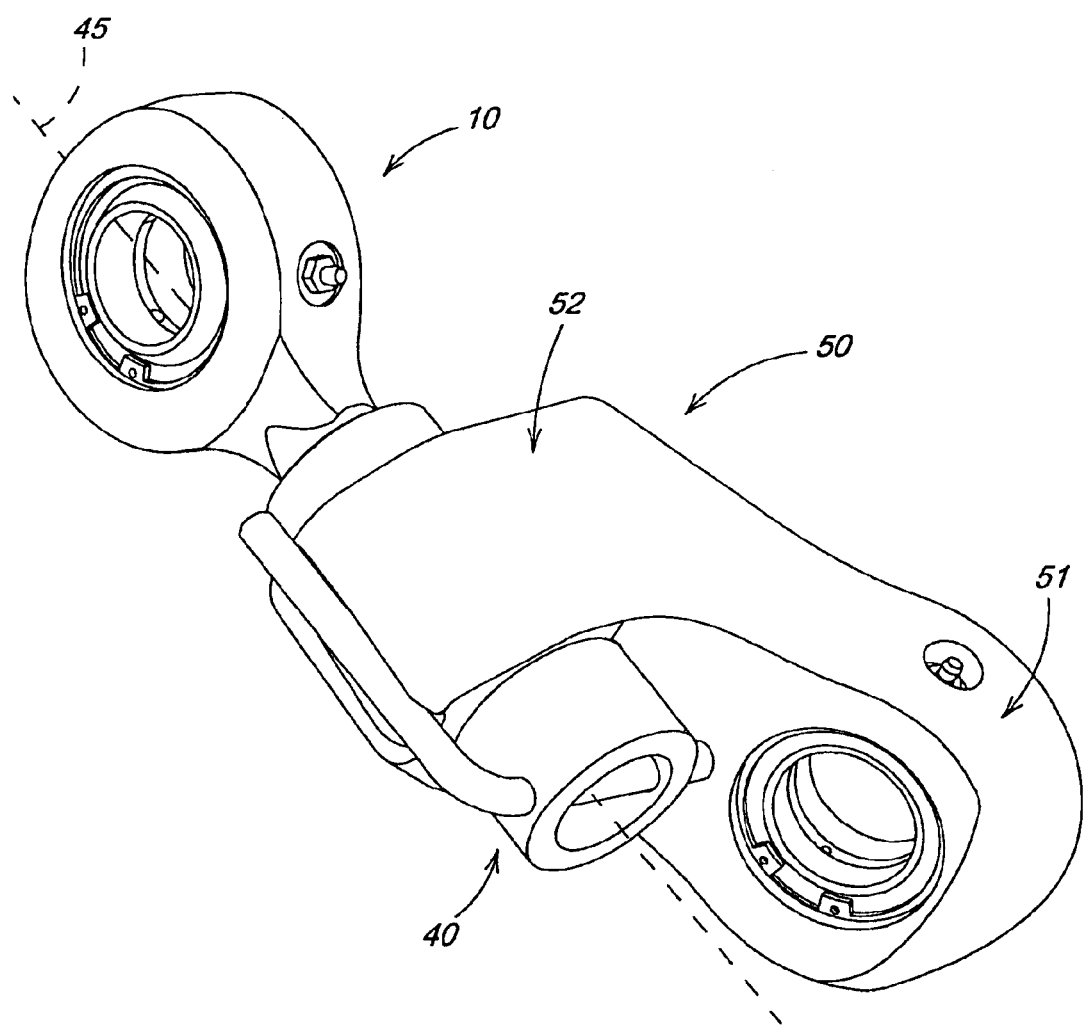
FIG. 5 is an oblique view of an alternative exemplary embodiment of the invention.
Figure 6:
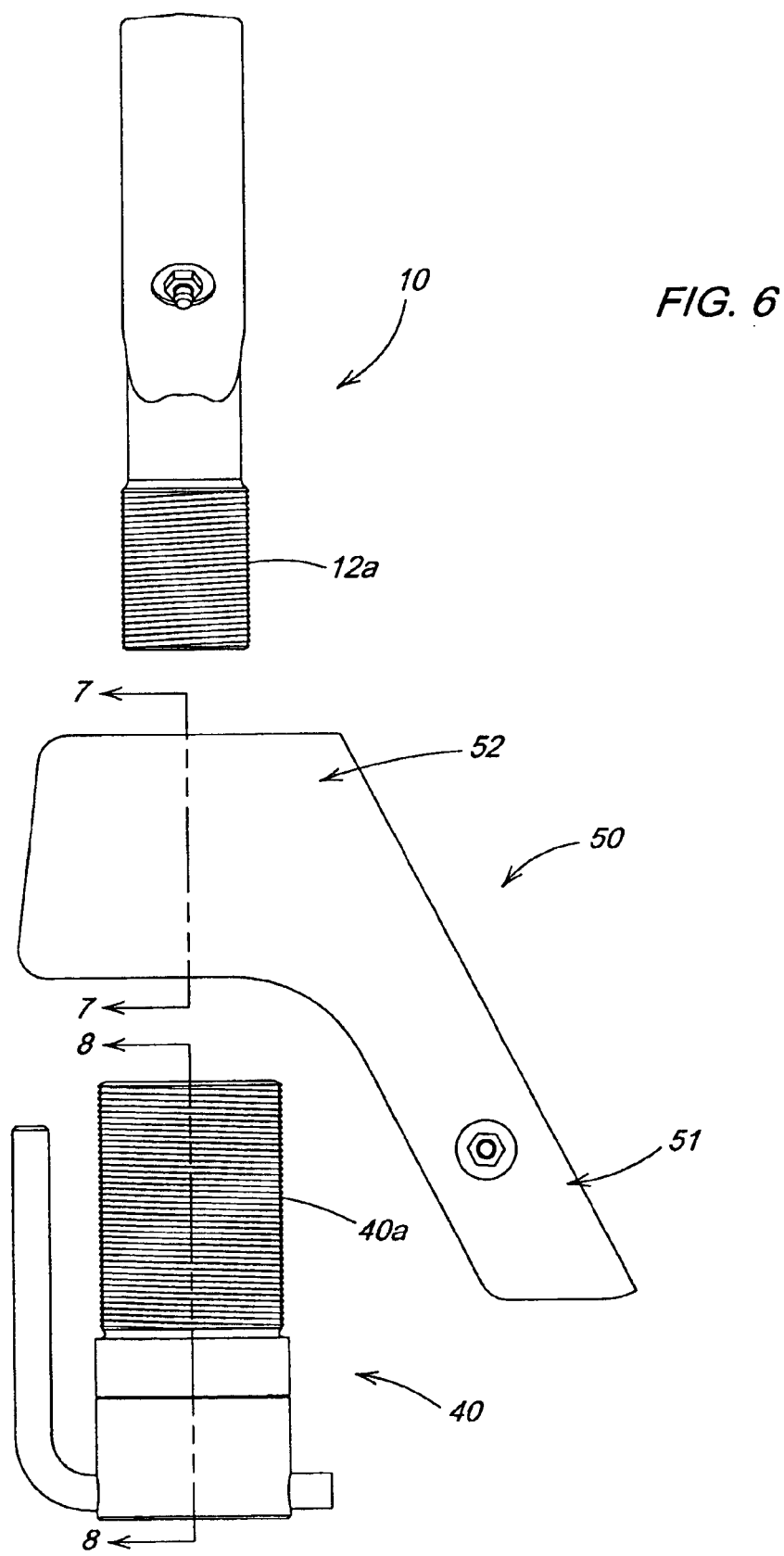
FIG. 6 is an exploded side view of the alternative turnbuckle illustrated in FIG. 5.
Figure 7:
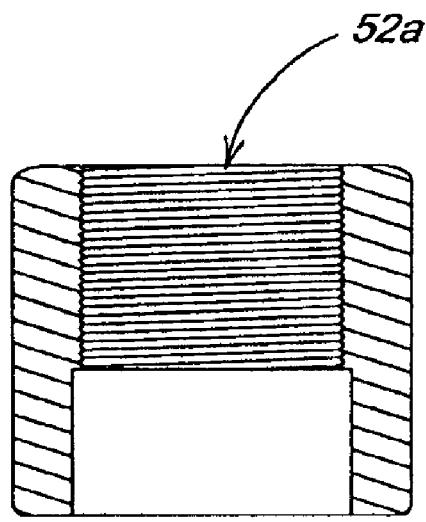
FIG. 7 is a sectional view of the alternative second end illustrated in FIG. 6.
Figure 8:
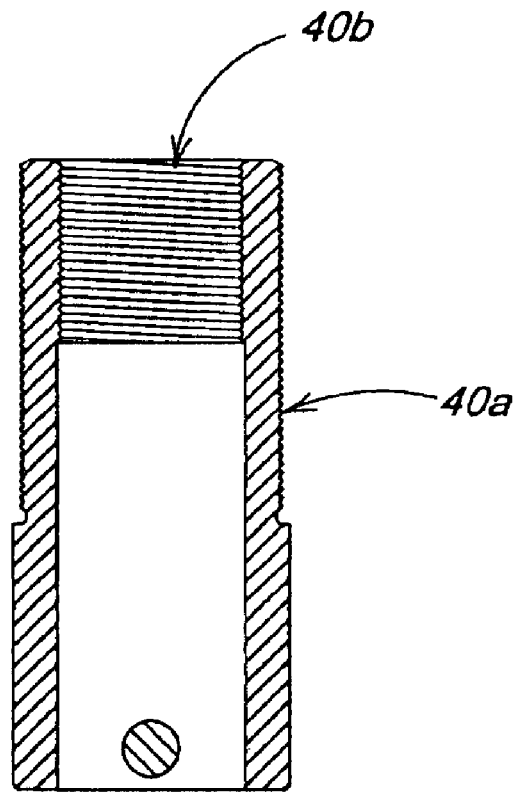
FIG. 8 is a sectional view of the alternative length adjuster illustrated in FIG. 6

FIG. 5 illustrates a second exemplary embodiment of the invention having the first end 10, an alternative second end 50 and an alternative length adjuster 40 lie along and rotate about rotational axis 45. In this particular embodiment, the second end 50 includes an alternative ring portion 51 and tubular portion 52 where the ring portion 51 of the second end 50 is offset from rotational axis and the tubular portion 52. As illustrated in FIG. 6 and FIG. 8, the length adjuster 40 for this embodiment has a second external thread 40a and a first internal 40b thread having a same direction as that of the second external thread 20a and the first internal thread 20b of the length adjuster 20 of the first exemplary embodiment illustrated in FIG. 1. Likewise, as illustrated in FIG. 6 and FIG. 7, the second end 50 of this embodiment has a second internal thread 52a having a same direction as the second internal thread 32a of the second end of the first exemplary embodiment.

Having described the illustrated embodiments, it will become apparent that various modifications can be made without departing from the scope of the invention as defined in the accompanying claims.

What is claimed is:

1. A telescoping link having an overall length and a rotational axis, the telescoping link comprising:

a first end having a first external thread, the first external thread having a first direction;

a length adjuster having a first internal thread and a second external thread, the first internal thread being threadedly engaged with the first external thread, the second external thread having a second direction opposed to the first direction; and a second end including a ring shaped portion and a tubular portion, the ring shaped portion and the tubular portion being integrated as one piece, the tubular portion having a second internal thread, the second internal thread being threadedly engaged with the second external thread.

2. The telescoping link of claim 1, wherein the first end, the second end and the length adjuster may be rotated about the rotational axis in a first rotational direction and a second rotational direction, the first rotational direction being opposite to the second rotational direction.

3. The telescoping link of claim 2, wherein the overall length is changed by a relative rotation of the first end through a first angle about the rotational axis, a relative rotation of the length adjuster through a second angle about the rotational axis, and a relative rotation of the second end through a third angle about the rotational axis, the second angle being greater in one of the first rotational direction and the second rotational direction than each of first angle and the third angle in the one of the first rotational direction and the second rotational direction.

4. The telescoping link of claim 2, wherein the overall length is altered by rotational immobilization of the first and second ends and rotation of the length adjuster in one of the first rotational direction and the second rotational direction.

5. The telescoping link of claim 4, wherein the first end includes a ring portion and a threaded shaft portion.

6. The telescoping link of claim 4, wherein the overall length is minimum when the first external thread is fully engaged with the first internal thread and the second external thread is fully engaged with the second internal thread.

7. The telescoping link of claim 5, wherein the second end includes a second ring portion and a tubular portion.

8. The telescoping link of claim 7, wherein the length adjuster includes a cylinder and a hexagonal portion.

9. The telescoping link of claim 7, wherein the length adjuster includes a cylinder and a leverage handle.

10. The telescoping link of claim 9, wherein the second ring portion is offset from the rotational axis of the turnbuckle.

11. A turnbuckle having an overall length, the turnbuckle comprising:

a first end including a first ring shaped portion and a first longitudinal portion having a first external thread, the first external thread having a first direction;

a length adjuster comprising a cylinder having a first internal thread and a second external thread, the first internal thread threadedly engaging the first external thread to form a first threaded engagement, the second external thread having a second direction, the second direction being opposite to the first direction; and a second end including a second ring shaped portion and a second longitudinal portion, the second ring shaped portion and the second longitudinal portion being integrated as one piece, the second longitudinal portion having a second internal thread, the second internal thread threadedly engaging the second external thread to form a second threaded engagement, the first threaded engagement and the second threaded engagement forming a common rotational axis.

12. The telescoping link of claim 9, wherein the overall length of the telescoping link may be altered by a rotation of the length adjuster about the common rotational axis.

* * * * *